United States Patent
Vijayvargiya

(10) Patent No.: US 11,841,797 B2
(45) Date of Patent: Dec. 12, 2023

(54) OPTIMIZING INSTANT CLONES THROUGH CONTENT BASED READ CACHE

(71) Applicant: VMWARE, INC., Palo Alto, CA (US)

(72) Inventor: Shirish Vijayvargiya, Pune (IN)

(73) Assignee: VMWARE, INC., Palo Alto, CA (US)

( * ) Notice: Subject to any disclaimer, the term of this patent is extended or adjusted under 35 U.S.C. 154(b) by 107 days.

(21) Appl. No.: 17/684,450

(22) Filed: Mar. 2, 2022

(65) Prior Publication Data

US 2023/0251967 A1 Aug. 10, 2023

(30) Foreign Application Priority Data

Jan. 13, 2022 (IN) .............................. 202241002047

(51) Int. Cl.
*G06F 12/0802* (2016.01)
*G06F 9/455* (2018.01)

(52) U.S. Cl.
CPC ...... *G06F 12/0802* (2013.01); *G06F 9/45558* (2013.01); *G06F 2212/65* (2013.01)

(58) Field of Classification Search
CPC ............. G06F 12/0802; G06F 2212/65; G06F 9/45558

USPC ......................................................... 711/118
See application file for complete search history.

(56) References Cited

U.S. PATENT DOCUMENTS

| 2010/0153617 | A1* | 6/2010 | Miroshnichenko | G06F 3/061 718/1 |
|---|---|---|---|---|
| 2018/0314542 | A1* | 11/2018 | Karkun | G06F 16/137 |
| 2021/0357322 | A1* | 11/2021 | Shveidel | G06F 3/0656 |

* cited by examiner

*Primary Examiner* — Hashem Farrokh
(74) *Attorney, Agent, or Firm* — Patterson + Sheridan, LLP

(57) ABSTRACT

The disclosure provides an approach for content based read cache (CBRC) digest file creation. Embodiments include determining a mapping between entries in a CBRC and physical block addresses (PBAs) associated with a source virtual machine (VM). Embodiments include creating a clone VM based on the source VM. Embodiments include, for each data block associated with the clone VM: determining a PBA associated with a logical block address (LBA) of the data block, determining, based on the mapping, whether data associated with the PBA is cached in the CBRC, and, if the data associated with the PBA is cached in the CBRC, copying a hash of the data from a first digest file of the source VM to a second digest file of the clone VM and associating the hash with the LBA in the second digest file.

20 Claims, 4 Drawing Sheets

OPTIMIZING INSTANT CLONES THROUGH CONTENT BASED READ CACHE

RELATED APPLICATION

Benefit is claimed under 35 U.S.C. 119(a)-(d) to Foreign Application Serial No. 202241002047 filed in India entitled "OPTIMIZING INSTANT CLONES THROUGH CONTENT BASED READ CACHE", on Jan. 13, 2022, by VMware, Inc., which is herein incorporated in its entirety by reference for all purposes.

BACKGROUND

Virtualized computing systems provide efficiency and flexibility for system operators by enabling computing resources to be deployed and managed as needed to accommodate specific applications and capacity requirements. As virtualized computing systems mature and achieve broad market acceptance, demand continues for increased performance of virtual endpoints and increased overall system efficiency.

A virtualized computing system involves multiple hosts in communication over a physical network infrastructure. Each host has one or more virtualized endpoints such as virtual machines (VMs), containers, or other virtual computing instances (VCIs). The virtualized endpoints can be connected to logical overlay networks. A logical overlay network may span multiple hosts and is decoupled from the underlying physical network infrastructure.

Hosts are configured to provide a virtualization layer, also referred to as a hypervisor. The virtualization layer abstracts processor, memory, storage, and networking resources into multiple virtual endpoints that run concurrently on the same host. Each VM may be configured to store and retrieve file system data within a corresponding storage system. Relatively slow access latencies associated with storage, such as hard disk drives implementing the storage system, give rise to a bottleneck in file system performance, reducing overall system performance.

A clone VM is a copy of another VM. In some embodiments, a clone VM refers to an instant clone. Cloning creates a VM from the running state of another VM resulting in a destination VM (i.e., the clone VM) that is identical to the source VM (i.e., the parent VM). For example, the clone VM has a processor state, virtual device state, memory state, and disk state identical to the source VM from which it is cloned at the instant it is cloned. However, because clone VMs typically share an underlying physical storage system with a parent VM (e.g., in some cases sharing some or all of the same underlying physical storage blocks), the creation of clone VMs can lead to performance degradation as the number of storage input/output (I/O) requests directed to the underlying physical storage system increases.

In some cases, to improve storage I/O performance, a cache may be stored in physical memory (e.g., random access memory (RAM)) configured within a host. The cache acts as a small, fast memory that stores recently accessed data items and can be used to satisfy data requests without accessing the storage. Accordingly, data requests satisfied by the cache are executed with less latency as the latency associated with accessing the storage is avoided. In some cases, a content based read cache (CBRC) may be used. A CBRC caches data such that the key used to retrieve data stored in the CBRC is based on a function of the data itself, and not a block address associated with the data. In particular, a hash of the data is stored as a key used to retrieve the actual data associated with the hash. Therefore, regardless of the block address indicated in an I/O request, such as a read I/O, the read I/O can be serviced from the CBRC, instead of storage, if the data associated with the block address is in the CBRC. For example, particular data may be the same for multiple block addresses, and therefore any read I/O that references any such block address may be serviced from CBRC when it stores the particular data.

To enable CBRC use, a virtual disk of a VM may be associated with a digest file, which is a cryptographical representation of the virtual disk that stores metadata about each data block of the virtual disk. In particular, for each such data block, a corresponding unique hash of the data (also referred to as content) of the data block is generated, for example by using a cryptographic hashing algorithm such as the secure hashing algorithm (SHA)-1 algorithm, and the hash is stored in the digest file. The digest file maintains a mapping of each block address (e.g., LBA) of each data block in the virtual disk to a corresponding hash. Thus, if a read I/O is received for an LBA associated with the VM, the digest file may be used to determine the hash that corresponds the LBA, and the hash may be used to access cached data in the CBRC.

However, when a clone VM is created from a source VM according to current techniques, there is not yet a digest file for the one or more virtual disks of the clone VM (e.g., since the virtual disks of the clone VM have different LBAs than corresponding virtual disks of the source VM). Generating a digest file can be a resource-intensive and time-consuming process, as it involves computing cryptographic hashes of data in each data block of a virtual disk, thereby requiring a read I/O and a hash computation for each data block. Creating digest files for clone VMs may add an excessive amount of load on physical computing resources, particularly when a large number of clone VMs are created. Furthermore, creating a digest file for a clone VM created through an instant clone process may detract from the benefits of an instant clone as the digest file creation process will cause poor performance or non-functionality of the clone VM for a time.

As such, there is a need in the art for improved techniques of enabling use of a CBRC for clone VMs.

SUMMARY

Embodiments provide a method for content based read cache (CBRC) digest file creation. Embodiments include determining a mapping between entries in a CBRC and physical block addresses (PBAs) associated with a source virtual machine (VM); creating a clone VM based on the source VM; and for each data block associated with the clone VM: determining a PBA associated with a logical block address (LBA) of the data block; determining, based on the mapping, whether data associated with the PBA is cached in the CBRC; and if the data associated with the PBA is cached in the CBRC, copying a hash of the data from a first digest file of the source VM to a second digest file of the clone VM and associating the hash with the LBA in the second digest file.

Further embodiments include a non-transitory computer-readable storage medium storing instructions that, when executed by a computer system, cause the computer system to perform the method set forth above, and a computer system programmed to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for enabling use of a content based read cache (CBRC) for clone virtual machines (VMs). In particular, a digest file is created for a clone VM by using mappings between logical block addresses (LBAs) and physical block addresses (PBAs) to identify and copy relevant information from a digest file for a source VM's virtual disk to the digest file for the clone VM's virtual disk. Thus, when creating a digest file for a clone VM's virtual disk according to embodiments of the present disclosure, hash computations only need to be performed for data blocks associated with the clone VM's virtual disk that were not already included in the digest file for the source VM's virtual disk.

By utilizing LBA-to-PBA mappings to determine which information can be copied from a digest file associated with a source VM to a digest file for a clone VM, techniques described herein significantly reduce processing resource utilization and storage I/O load required to generate a digest file for a clone VM. Accordingly, because embodiments of the present disclosure allow a digest file to be created for a clone VM in a fast and resource-efficient manner, digest files may be created as described herein for clone VMs created using an instant clone process without inhibiting or delaying the performance of the clone VMs. Creating digest files for clone VMs as described herein allows a CBRC to be utilized for the clone VMs, thereby reducing load on the underlying storage system and improving performance of the computing devices involved.

Figure 1:
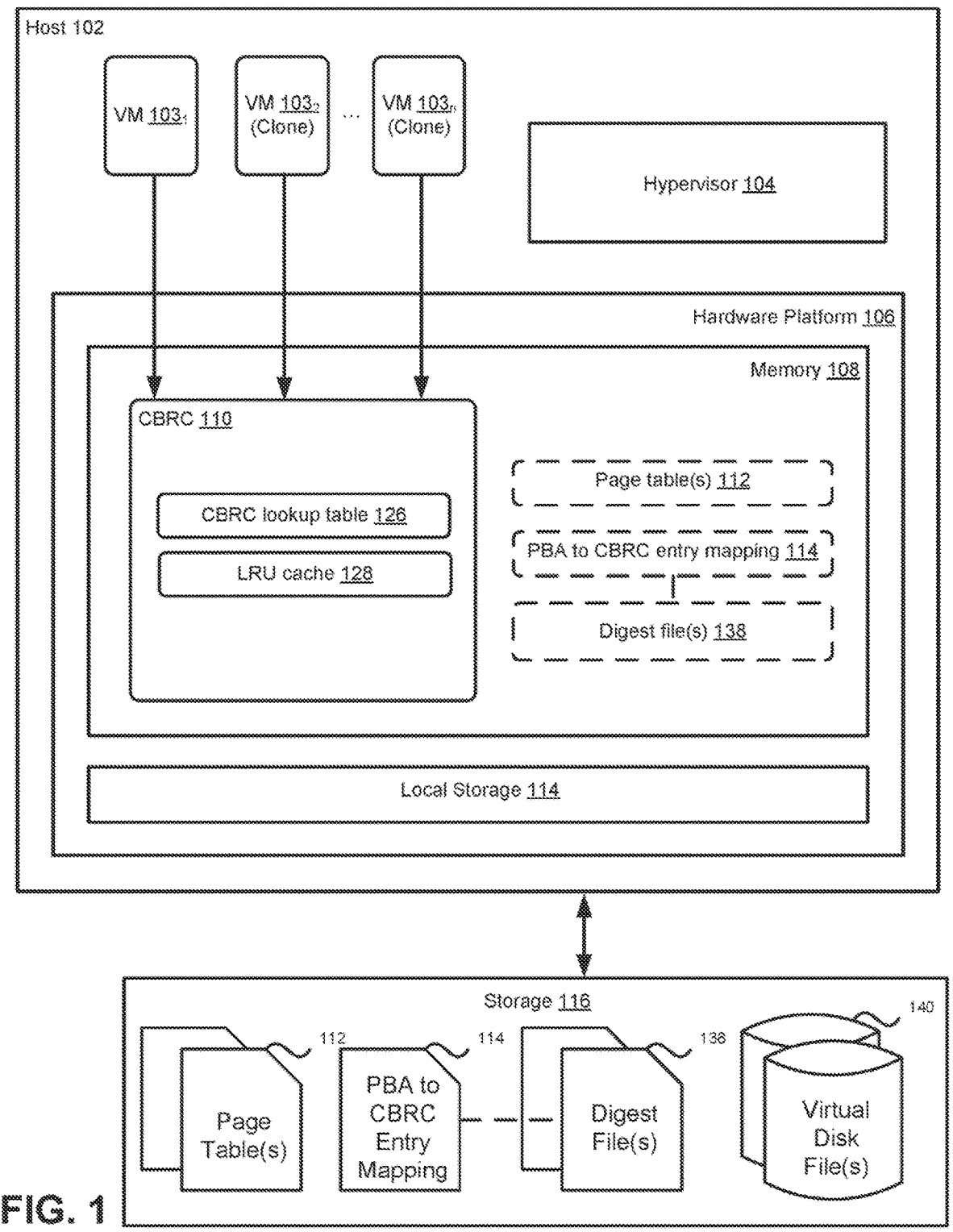
FIG. 1 depicts a host computing system in accordance with embodiments of the present disclosure.

FIG. 1 depicts a host computing system 100 in accordance with embodiments of the present disclosure. Host computing system 100 is representative of a virtualized computer architecture. As shown, host computing system 100 includes a host 102 and storage 116.

Host 102 may be constructed on a server grade hardware platform 106, such as an x86 architecture platform. Host 102 is configured to provide a virtualization layer, also referred to as a hypervisor 104, that abstracts processor, memory, storage, and networking resources of hardware platform 106 into multiple virtual machines (VMs) $103_1$ to $103_n$ (collectively referred to as VMs 103 and individually referred to as VM 103) that run concurrently on the same host 102. Though certain techniques herein are discussed with respect to VMs, they may similarly be applicable to other suitable virtual computing instances (VCIs), such as containers, virtual appliances, and/or the like. In some embodiments, VMs $103_2$ to $103_n$ are clone VMs created (e.g., using an instant clone process) from VM $103_1$, which may be a source VM. For example, $103_2$ to $103_n$ may have been created for a virtual desktop infrastructure (VDI) environment. In a VDI environment, a local client device can access and display a remote virtual or physical desktop or remote application that is running on a remote device. For instance, a virtual desktop (e.g., a representing a desktop of a VM) may be hosted on a central infrastructure known as a VDI, and may be rendered on a client device using a remote display protocol.

Storage 116 provides VMs access to consolidated, block-level data storage. In one embodiment, storage 116 is a virtual storage area network (vSAN) that aggregates local or direct-attached capacity devices of a host cluster and creates a single storage pool shared across all hosts in the cluster. In another embodiment, storage 116 is storage directly coupled to host 102. In another embodiment, storage 116 includes local storage 114 in hardware platform 106.

Storage 116 manages storage of data at a block granularity. For example, storage 116 is divided into a number of physical blocks (e.g., 4096 bytes or "4K" size blocks), each physical block having a corresponding physical block address (PBA) that indexes the physical block in storage. The physical blocks of storage 116 are used to store blocks of data (also referred to as data blocks) used by VMs 103, which may be referenced by logical block addresses (LBAs), as discussed herein. Each block of data may have an uncompressed size corresponding to a physical block. Blocks of data may be stored as compressed data or uncompressed data in storage 116, such that there may or may not be a one to one correspondence between a physical block on storage 116 and a data block referenced by a logical block address.

Storage 116 receives I/O requests for a data block from a VM, which the VM refers to using a guest LBA that is in an address space used by the VM to address blocks of data. Such an LBA may be referred to as an LBA of the data block. Different VMs may use the same LBA to refer to different data blocks, as the LBA is specific to the VM.

Storage 116 stores the data block in a physical block. The physical block where the data block is stored is referred to as a physical block of the data block. The physical block of the data block is addressed by a PBA corresponding to the physical block. One or more mapping tables such as page table(s) 112 may be used to map the relationship between an LBA and its corresponding PBA, as is known in the art.

One or more virtual disks backed by virtual disk files 140 stored in storage 116 each has a separate associated digest file 138 that is created and stored in storage 116. Techniques for creation of digest files for clone VMs are described herein. A digest file 138 is a cryptographical representation of the virtual disk and stores metadata about each data block of the virtual disk 140. In particular, for each such data block, a corresponding unique hash of the data (also referred to as content) of the data block is generated, for example by using a cryptographic hashing algorithm such as the SHA-1 algorithm, and the hash is stored in the digest file. The digest file 138 maintains a mapping of each block address (e.g., LBA) of each data block in the virtual disk to a corresponding hash. For example, the digest file 138 stores tuples of <LBA, hash of data referenced by the LBA, validity bit>, where the LBA is the key. The validity bit indicates whether the particular LBA is "valid" or "invalid." An LBA is valid if there is actual data stored in virtual disk file 140/storage 116 that is addressed by the LBA. An LBA is invalid if there is no data stored in virtual disk file 140/storage 116 that is addressed by the LBA (e.g., due to deletion, initialization, etc.). According to embodiments of the present disclosure, a digest file 138 may also include PBA to CBRC mapping 114. For example, a digest file may be extended to include a PBA for each LBA to hash mapping, thereby mapping PBAs to CBRC entries (which are indexed by hashes). In alternative embodiments, PBA to CBRC mapping 114 is stored separately from the digest file 138.

Hypervisor 104 runs in conjunction with an OS (not shown) in host 102. Hypervisor 104 can be installed as system level software directly on hardware platform 106 of host 102 (often referred to as "bare metal" installation) and be conceptually interposed between the physical hardware and the guest OSs executing in the VMs 103. One or more storage management modules may also run on host 102, and may handle processing of read and write I/Os, such as using techniques described herein.

Hardware platform 106 of host 102 includes physical resources of a computing device, such as a memory 108 and local storage 114. Hardware platform 106 may include other physical resources of a computing devices, not shown in FIG. 1, such as one or multiple processor(s), accelerator(s), a disk interface, and/or a network interface. As discussed, physical resources of host 102 can be abstracted into a number of VMs 103 by hypervisor 106, such that the physical resources of the host 102 may be shared by VMs 103 residing on host 102.

Local storage 114 may include one or more hard disks, flash memory modules, solid state disks, and/or optical disks. Memory 108 may include, for example, one or more RAM modules. Memory 108 contains a CBRC 110, such as in one or more reserved memory spaces. Memory 108 also contains in-memory copies of page table(s) 112 and digest file(s) 138 (including PBA to CBRC entry mapping 114), described herein. For example, when a VM 103 is powered on, the page table(s) 112 and digest file(s) 138 associated with the virtual disk(s) 140 of the VM 103 may be loaded into memory 108 such that there is an in-memory copy of the page table(s) 112 and digest file(s) 138 accessible, thereby avoiding I/O to storage 116.

CBRC 110 is generally a cache for data (e.g., corresponding to contents of data blocks of virtual disks backed by virtual disk files) accessed by VMs 103. CBRC 110 may be implemented as a virtual small computer system interface (vSCSI) that maintains a global cache on host 102 to serve read I/O requests for VMs 103. Data stored in CBRC 110 is not tied to any particular VM 103 and may be shared across VMs 103 on host 102, thus, this implementation allows for the detection of duplicate content of data blocks across VMs 103 running on host 102, as well as the servicing of I/Os across VMs 103 running on host 102 from CBRC 110.

As shown, CBRC 110 includes least recently used (LRU) cache 128, which stores data for CBRC 110 that are indexed by CBRC lookup table 126. LRU is a cache eviction strategy, wherein if the cache size has reached the maximum allocated capacity, the least recently accessed object(s) in the cache will be evicted from the cache. Data in CBRC LRU cache 128 are maintained in LRU order. It is noted that LRU is included as an example, and other eviction strategies may be used. CBRC 110 manages the LRU cache 128 by monitoring capacity of the LRU 128 when accommodating new data corresponding to blocks of data in CBRC LRU cache 128. When capacity is reached, CBRC 110 evicts least recently accessed data first.

CBRC 110 further includes CBRC lookup table 126. CBRC lookup table 126 indexes the data stored in LRU cache 128 by hashes of data. For example, CBRC lookup table 126 stores tuples of <hash of data, memory location of data>, where the hash is the key. Thus, given a hash of data, the CBRC lookup table 126 can be used to determine if the data is stored in LRU cache 128, and if so, the location of the data (e.g., in memory 108) such that it can be retrieved from LRU cache 128.

For example, if a read I/O indicating an LBA of a virtual disk file 140 is received from a VM 103, the digest file 138 (e.g., in-memory copy) of the virtual disk file 140 can be used to retrieve a hash of the data of a data block stored in storage 116 as associated with the LBA. The hash of the data is used to search the CBRC lookup table 126 to determine if there is a matching hash, such that the read I/O can be serviced from the CBRC 110, instead of issuing the read I/O to the virtual disk file 140 in storage 116. It should be noted that hashes of data stored in digest file 138, CBRC lookup table 126, and other data structures discussed herein are consistent such that for a given data, the same hash is stored in each data structure. For example, the hashes are generated using a same hashing algorithm for each data structure. In some embodiments, the data stored in CBRC 110 is deduplicated, meaning that a given data is stored only once in CBRC 110, regardless of the number of LBAs for which I/Os are received that are associated with the given data. This helps to reduce the amount of memory needed to implement CBRC 110.

As described in more detail below with respect to FIG. 2, PBA to CBRC entry mapping 114 may be created (e.g., added to a digest file 138) for a virtual disk 140 corresponding to a source VM (e.g., VM $103_1$) based on a page table 112 for the virtual disk 140. The PBA to CBRC entry mapping 114 may then be used to identify and copy relevant information (e.g., hashes) from the digest file 138 for the virtual disk 140 to a new digest file 138 for a virtual disk 140 of a clone VM (e.g., VM $103_2$). Thus, digest files may be efficiently created for clone VMs without requiring redundant computation of hashes for data blocks that have already been cached for the source VM.

Once a digest file 138 has been created for a clone VM, the digest file 138 can then be used to respond to read requests from the clone VM via CBRC 110, as described in more detail below with respect to FIG. 3.

Figure 2:
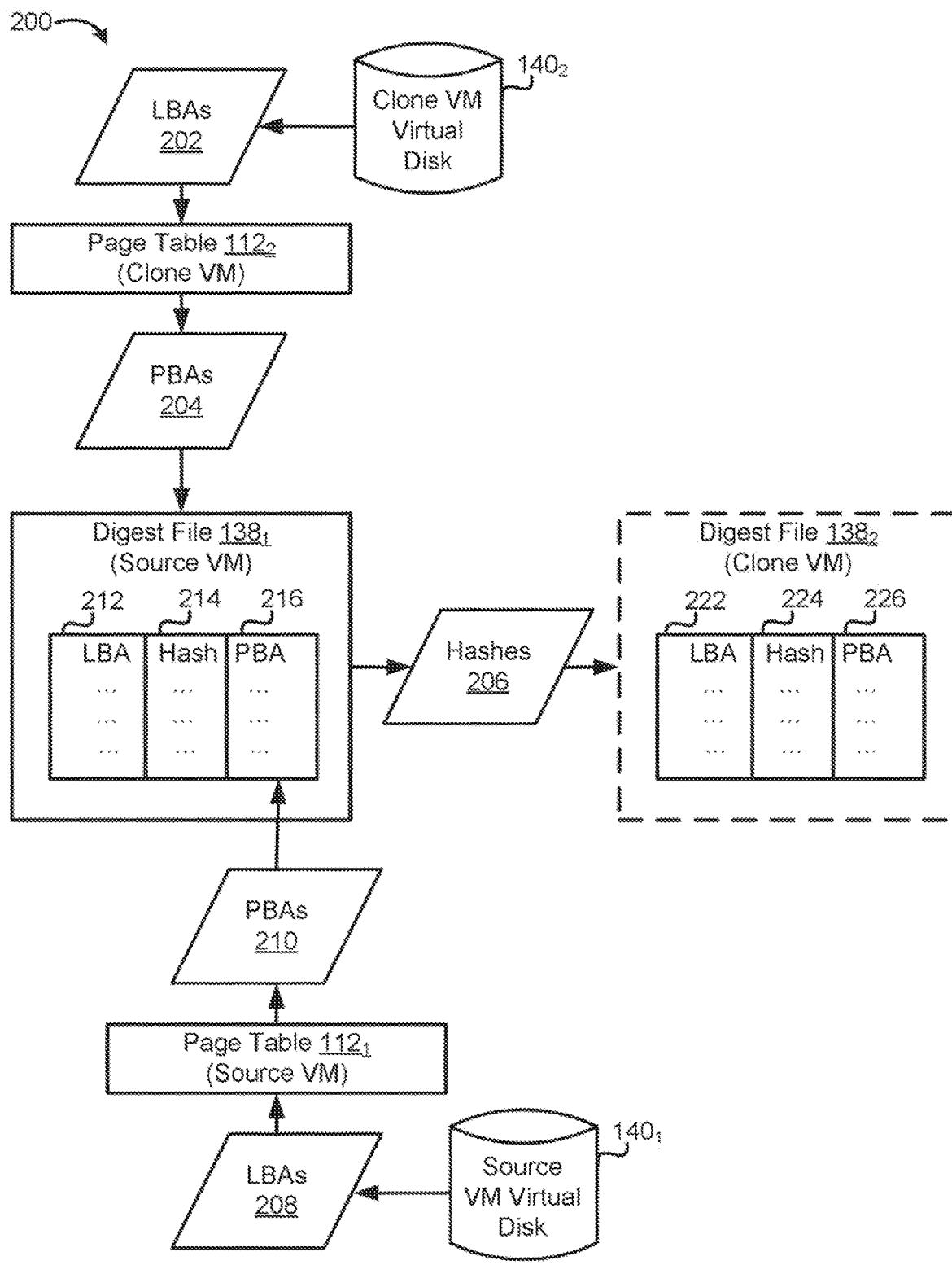
FIG. 2 is an illustration of an example related to content based read cache (CBRC) digest file generation for clone virtual machines (VMs).

FIG. 2 is an illustration 200 of an example related to content based read cache (CBRC) digest file generation for clone virtual machines (VMs). Illustration 200 includes virtual disks $140_1$ and $140_2$, page tables $112_1$ and $112_2$, and digest files $138_1$ and $138_2$, which correspond to virtual disk file(s) 140, page table(s) 112, and digest file(s) 138 of FIG. 1, described above.

Digest file $138_1$ corresponds to a source VM, such as VM $103_1$ of FIG. 1, from which a clone VM was created, such as using an instant clone process. According to existing techniques, digest file $138_1$ includes a mapping of LBAs 212 to hashes 214. Certain techniques described herein involve extending digest file $138_1$ to include PBAs 216 in association with LBAs 212 and hashes 214.

In an example, LBAs 208 of a source VM virtual disk $140_1$ (e.g., the LBAs of all data blocks in the virtual disk) are determined. A page table $112_1$ of the source VM is then used to determine the PBAs 210 that correspond to LBAs 208 based on LBA-to-PBA mappings that are included in page table $112_1$. A mapping between PBAs 210 and CBRC entries (e.g., indexed by hashes 214) is then created, such as by adding a corresponding PBA 210 to each entry in digest file $138_1$, thereby resulting in mappings between LBAs 214, hashes 214, and PBAs 216 in digest file $138_1$. In alternative embodiments, a mapping between PBAs 216 and hashes 214 are in stored separately from digest file $138_1$. Furthermore, while not shown, each LBA 214 and/or PBA 216 may be associated (e.g., in digest file $138_1$) with an identifier of a storage device to which the LBA 214 and/or PBA 216 corresponds, such as a physical storage device identifier and/or logical volume management (LVM) identifier.

After a clone VM is created, such as VM $103_2$ of FIG. 1, a digest file $138_2$ for a virtual disk $140_2$ of the clone VM is created according to techniques described herein. In an example, LBAs 202 of the clone VM virtual disk $140_2$ (e.g., the LBAs of all data blocks in the virtual disk) are determined. A page table $112_2$ of the source VM is then used to determine the PBAs 204 that correspond to LBAs 202 based on LBA-to-PBA mappings that are included in page table $112_2$. PBAs 204 are then used to identify information (e.g., hashes 206) that can be copied from digest file $138_1$ to digest file $138_2$.

In some embodiments, for each PBA 204, digest file $138_1$ is searched for the PBA 204 and, if the PBA 204 is included in digest file $138_1$ (e.g., in PBAs 216), then the hash 214 that corresponds to the PBA 204 in digest file $138_1$ is copied to digest file $138_2$ (e.g., and stored in hashes 224). If the PBA 204 is not included in digest file $138_1$, then the data corresponding to the PBA 204 is retrieved from storage and a hash of the data is computed and stored in digest file $138_2$ (e.g., in hashes 224). The data may also be cached in the CBRC at this time (e.g., since the data is read from storage in order to compute the hash, it may be stored in the CBRC along with the hash).

Thus, hashes 206 represent hashes 214 that correspond to PBAs 204 and are therefore copied from digest file $138_1$ to digest file $138_2$. Digest file $138_2$, once created according to techniques described herein, comprises mappings of LBAs 222 to hashes 224 and PBAs 226. For example, each hash 206 that is copied from digest file $138_1$ and/or each hash that is computed (e.g., as needed when not already present in digest file $138_1$) is stored in digest file $138_2$ file in association with the corresponding LBA 202 and PBA 204 used to retrieve and/or compute the hash.

It is noted that the process described herein with respect to illustration 200 may be repeated for each virtual disk associated with a VM (e.g., if a VM has multiple virtual disks) in order to create a digest file for each virtual disk.

Figure 3:
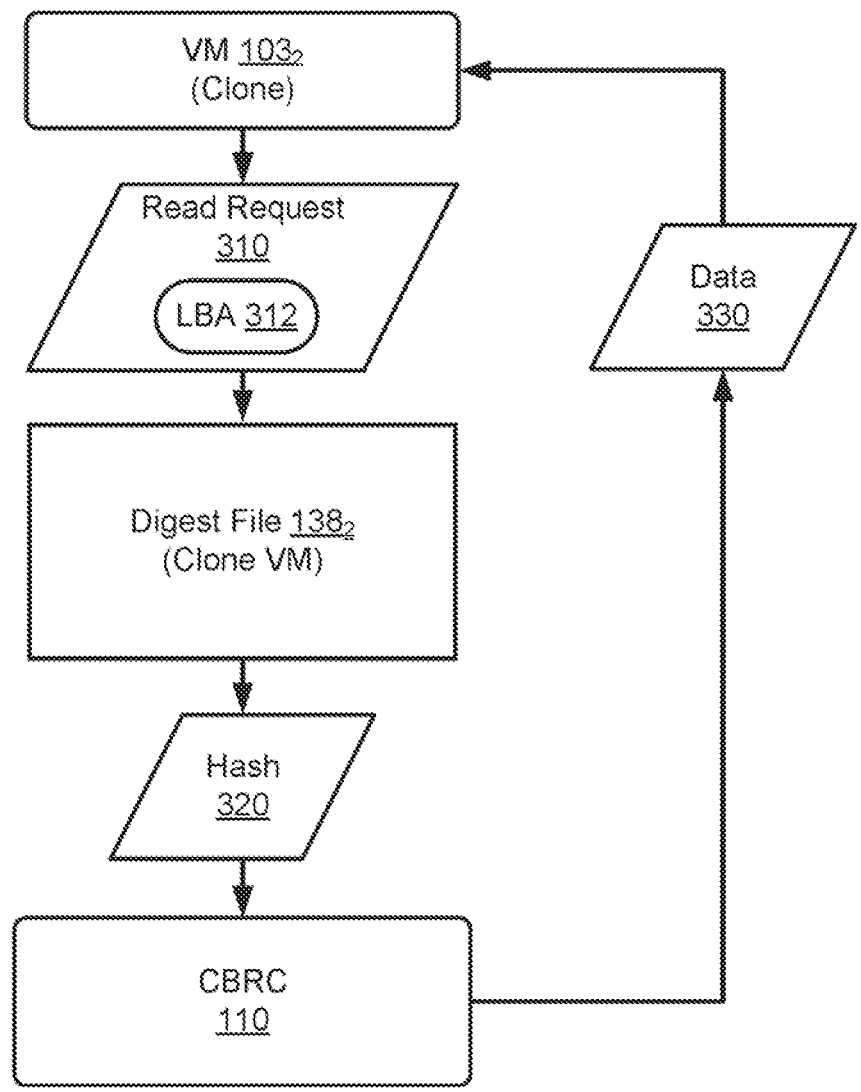
FIG. 3 is an illustration of an example related to utilizing a content based read cache (CBRC) for clone virtual machines (VMs) with a digest file created as described herein.

FIG. 3 is an illustration 300 of an example related to utilizing a content based read cache (CBRC) for clone virtual machines (VMs) with a digest file created as described herein. Illustration 300 includes VM $103_2$ and CBRC 110 of FIG. 1 and digest file $138_2$ of FIG. 2. For example, digest file $138_2$ may have been created for a virtual disk of VM $103_2$ (e.g., a clone VM) as described above with respect to FIG. 2.

VM $103_2$ may represent a clone VM created using an instant clone process. In certain aspects, instant cloning uses rapid in-memory cloning of a running source VM, and copy-on-write (COW) to rapidly deploy the clone VM. To create the clone VM, the source VM is stunned for a short period of time (e.g., less than 1 second) and brought to a quiescent state. While the source VM is stunned, a new writable delta disk is generated for each virtual disk of the VM, such that each virtual disk is represented by a base disk and a delta disk. A base disk of a virtual disk of the VM includes data of the virtual disk before the clone VM is made of the source VM. The delta disk is used to store data corresponding to writes to the virtual disk that occur after the clone VM is made of the source VM. The source VM and the clone VM share the base disk of the virtual disk, which may be put in a read-only state. However, each of the source VM and the clone VM may have its own respective delta disk where writes to virtual disk are made from the source VM and the clone VM, respectively. Thus, read I/O requests from both the source VM and the clone VM are served from the base disk for shared data blocks, or from the respective delta disk for modified data blocks after the cloning, while write I/Os of the source VM are written to the delta disk of the source VM and write I/Os of the clone VM are written to the delta disk of the clone VM. Accordingly, if the clone VM modifies data on the virtual disk, the data on the source VM is not modified, thus preserving security and isolation between the source VM and the clone VM.

Regardless of whether a read I/O from the clone VM refers to an LBA that corresponds to the base disk or the delta disk of the clone VM, creating a digest file for the clone VM as described herein allows the read i/O to be served from the CBRC if the requested data is cached in the CBRC. As such, techniques described herein may greatly reduce load on the underlying storage system, particularly when multiple clone VMs are created. The digest file for a clone VM may be created according to embodiments of the present disclosure at the time the instant clone is performed, thereby allowing the CBRC to be utilized as soon as the clone VM is created.

In illustration 300, VM $103_2$ issues a read request 310 comprising an LBA 312 (e.g., indicating the LBA from which data is requested to be read). The digest file $138_2$ (e.g., in memory) of a virtual disk of VM $103_2$ is used to determine whether the data corresponding to LBA 312 has been cached in the CBRC. For example, if digest file $138_2$ contains an entry comprising LBA 312, then the hash 320 associated with LBA 312 in the entry is retrieved. The retrieved hash 320 is used to find a memory location of the requested data in CBRC 110, such as using CBRC lookup table 126 of FIG. 1. If hash 320 is found in the CBRC lookup table, the requested data 330 may be retrieved from CBRC 110 and returned to VM $103_2$. If hash 320 is not found in the CBRC lookup table, the requested data may be retrieved from the virtual disk file 140 in storage 116 of FIG. 1 (e.g., using the PBA that is mapped to LBA 312 in a corresponding page table).

Though certain aspects herein describe I/Os with respect to blocks, they may similarly be applicable to I/Os for pages, where a page comprises multiple blocks.

Aspects of the present disclosure may provide a significant benefit to virtual desktop environments (VDIs) experiencing boot storms. A VDI boot storm is the degradation of service that occurs when a significant number of virtual endpoints boot up within a narrow time frame and overwhelm the network with data requests. Boot files of each of the VMs may be the same, thus, aspects described herein may help to ensure data block content accessed by VMs is served from CBRC 110 whenever possible rather than being retrieved from storage.

Figure 4:
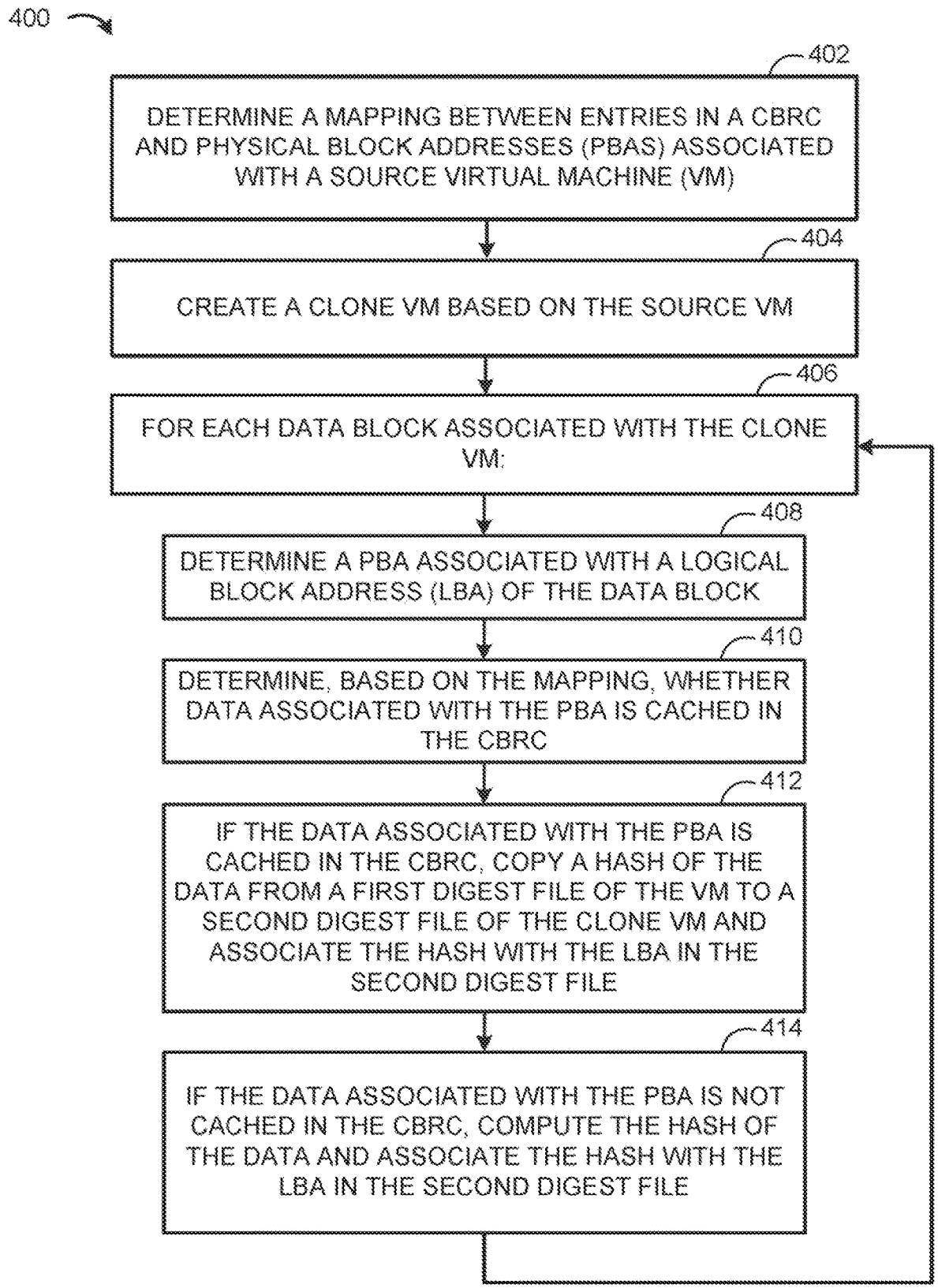
FIG. 4 depicts example operations related to content based read cache (CBRC) digest file generation for clone virtual machines (VMs).

FIG. 4 depicts example operations 400 related to related to content based read cache (CBRC) digest file generation for clone virtual machines (VMs). For example, operations 400 may be performed by a storage management module on host 102 of FIG. 1.

Operations 400 begin at step 402, with determining a mapping between entries in a CBRC and physical block addresses (PBAs) associated with a source virtual machine (VM).

In some embodiments, determining the mapping between entries in the CBRC and the PBAs associated with the VM is based on the first digest file and a page table associated with the source VM that maps LBAs to PBAs. In certain embodiments, the PBAs are associated in the mapping with one or more identifiers of one or more storage devices.

According to some embodiments, the mapping is stored in the first digest file. In other embodiments, the mapping is stored separately from the first digest file.

Operations 400 continue at step 404, with creating a clone VM based on the source VM. In certain embodiments, creating the clone VM based on the source VM comprises performing an instant clone operation in which the clone VM is created from a running state of the source VM while the source VM is powered on, and wherein the clone VM is created in a powered on state. For example, the instant clone operation may be performed as part of a virtual desktop interface (VDI) deployment.

Operations 400 continue at step 406, with, for each data block associated with the clone VM, performing steps 408, 410, 412, and 414.

Step 408 comprises determining a PBA associated with a logical block address (LBA) of the data block.

Step 410 comprises determining, based on the mapping, whether data associated with the PBA is cached in the CBRC.

Step 412 comprises, if the data associated with the PBA is cached in the CBRC, copying a hash of the data from a first digest file of the source VM to a second digest file of the clone VM and associating the hash with the LBA in the second digest file.

Step 414 comprises, if the data associated with the PBA is not cached in the CBRC, computing the hash of the data and associating the hash with the LBA in the second digest file. If the data associated with the PBA has not been cached in the CBRC, some embodiments further comprise creating a new entry in the CBRC comprising the data associated with the hash and storing a new mapping between the new entry in the CBRC and the PBA.

Certain embodiments further comprise receiving a storage read request comprising a given LBA associated with the clone VM and retrieving, based on the storage read request, the given data from the CBRC using a given hash associated with the LBA in the second digest file.

The various embodiments described herein may employ various computer-implemented operations involving data stored in computer systems. For example, these operations may require physical manipulation of physical quantities-usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces.

Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for content based read cache (CBRC) digest file creation, comprising:
   determining a mapping between entries in a CBRC and physical block addresses (PBAs) associated with a source virtual machine (VM);
   creating a clone VM based on the source VM; and
   for each data block associated with the clone VM:
      determining a PBA associated with a logical block address (LBA) of the data block;
      determining, based on the mapping, whether data associated with the PBA is cached in the CBRC; and
      if the data associated with the PBA is cached in the CBRC, copying a hash of the data from a first digest file of the source VM to a second digest file of the clone VM and associating the hash with the LBA in the second digest file.

2. The method of claim 1, further comprising, if the data associated with the PBA is not cached in the CBRC, computing the hash of the data and associating the hash with the LBA in the second digest file.

3. The method of claim 2, further comprising, if the data associated with the PBA is not cached in the CBRC:
   creating a new entry in the CBRC comprising the data associated with the hash; and
   storing a new mapping between the new entry in the CBRC and the PBA.

4. The method of claim 1, further comprising:
   receiving a storage read request comprising a given LBA associated with the clone VM; and
   retrieving, based on the storage read request, given data from the CBRC using a given hash associated with the LBA in the second digest file.

5. The method of claim 1, wherein determining the mapping between entries in the CBRC and the PBAs associated with the source VM is based on the first digest file and a page table associated with the source VM that maps LBAs to PBAs.

6. The method of claim 1, wherein creating the clone VM based on the source VM comprises performing an instant clone operation in which the clone VM is created from a running state of the source VM while the source VM is powered on, and wherein the clone VM is created in a powered on state.

7. The method of claim 6, wherein the instant clone operation is performed as part of a virtual desktop interface (VDI) deployment.

8. The method of claim 1, wherein the PBAs are associated in the mapping with one or more identifiers of one or more storage devices.

9. The method of claim 1, wherein the mapping is stored in the first digest file.

10. A system for content based read cache (CBRC) digest file creation, the system comprising:
    at least one memory; and
    at least one processor coupled to the at least one memory, the at least one processor and the at least one memory configured to:
       determine a mapping between entries in a CBRC and physical block addresses (PBAs) associated with a source virtual machine (VM);
       create a clone VM based on the source VM; and
       for each data block associated with the clone VM:
          determine a PBA associated with a logical block address (LBA) of the data block;
          determine, based on the mapping, whether data associated with the PBA is cached in the CBRC; and
          if the data associated with the PBA is cached in the CBRC, copy a hash of the data from a first digest file of the source VM to a second digest file of the clone VM and associating the hash with the LBA in the second digest file.

11. The system of claim 10, wherein the at least one processor and the at least one memory are further configured to, if the data associated with the PBA is not cached in the CBRC, compute the hash of the data and associating the hash with the LBA in the second digest file.

12. The system of claim 11, wherein the at least one processor and the at least one memory are further configured to, if the data associated with the PBA is not cached in the CBRC:
    create a new entry in the CBRC comprising the data associated with the hash; and
    store a new mapping between the new entry in the CBRC and the PBA.

13. The system of claim 10, wherein the at least one processor and the at least one memory are further configured to:
    receive a storage read request comprising a given LBA associated with the clone VM; and
    retrieve, based on the storage read request, given data from the CBRC using a given hash associated with the LBA in the second digest file.

14. The system of claim 10, wherein determining the mapping between entries in the CBRC and the PBAs associated with the source VM is based on the first digest file and a page table associated with the source VM that maps LBAs to PBAs.

15. The system of claim 10, wherein creating the clone VM based on the source VM comprises performing an instant clone operation in which the clone VM is created from a running state of the source VM while the source VM is powered on, and wherein the clone VM is created in a powered on state.

16. The system of claim 15, wherein the instant clone operation is performed as part of a virtual desktop interface (VDI) deployment.

17. The system of claim 10, wherein the PBAs are associated in the mapping with one or more identifiers of one or more storage devices.

18. The system of claim 10, wherein the mapping is stored in the first digest file.

19. A non-transitory computer-readable medium storing instructions that, when executed by one or more processors, cause the one or more processors to:
- determine a mapping between entries in a CBRC and physical block addresses (PBAs) associated with a source virtual machine (VM);
- create a clone VM based on the source VM; and
- for each data block associated with the clone VM:
  - determine a PBA associated with a logical block address (LBA) of the data block;
  - determine, based on the mapping, whether data associated with the PBA is cached in the CBRC; and
  - if the data associated with the PBA is cached in the CBRC, copy a hash of the data from a first digest file of the source VM to a second digest file of the clone VM and associating the hash with the LBA in the second digest file.

20. The non-transitory computer-readable medium of claim 19, wherein the instructions, when executed by the one or more processors, further cause the one or more processors to, if the data associated with the PBA is not cached in the CBRC, compute the hash of the data and associating the hash with the LBA in the second digest file.

* * * * *